(12) United States Patent
Ferrer et al.

(10) Patent No.: US 8,662,838 B2
(45) Date of Patent: Mar. 4, 2014

(54) COMPRESSOR HOUSING RESISTANT TO TITANIUM FIRE, HIGH-PRESSURE COMPRESSOR INCLUDING SUCH A HOUSING AND AIRCRAFT ENGINE FITTED WITH SUCH A COMPRESSOR

(75) Inventors: Laurent Ferrer, Lieusaint (FR); Claude Marcel Mons, Savigny le Temple (FR)

(73) Assignee: SNECMA, Paris (FR)

( * ) Notice: Subject to any disclaimer, the term of this patent is extended or adjusted under 35 U.S.C. 154(b) by 454 days.

(21) Appl. No.: 13/060,708

(22) PCT Filed: Sep. 3, 2009

(86) PCT No.: PCT/EP2009/061382
§ 371 (c)(1),
(2), (4) Date: Jun. 17, 2011

(87) PCT Pub. No.: WO2010/026180
PCT Pub. Date: Mar. 11, 2010

(65) Prior Publication Data
US 2011/0236192 A1    Sep. 29, 2011

(30) Foreign Application Priority Data

Sep. 5, 2008  (FR) ...................................... 08 55959

(51) Int. Cl.
*F01D 11/12* (2006.01)
(52) U.S. Cl.
USPC ............................. 415/200; 415/220; 415/196
(58) Field of Classification Search
USPC ................... 415/182.1, 200, 220, 217.1, 196;
148/527, 530; 29/421.1
See application file for complete search history.

(56) References Cited

U.S. PATENT DOCUMENTS

| 4,155,681 | A |   | 5/1979 | Linko, III et al. |
| 4,642,027 | A |   | 2/1987 | Popp |
| 4,659,282 | A |   | 4/1987 | Popp |
| 5,006,419 | A |   | 4/1991 | Grunke et al. |
| 5,102,697 | A |   | 4/1992 | Grunke et al. |
| 5,536,022 | A | * | 7/1996 | Sileo et al. ..................... 277/415 |

(Continued)

FOREIGN PATENT DOCUMENTS

| CN | 1598025 A | 3/2005 |
| EP | 0 386 486 | 9/1990 |

(Continued)

OTHER PUBLICATIONS

Japanese Office Action issued Jul. 2, 2013 in Patent Application No. 2011-525547 with English Translation.

(Continued)

*Primary Examiner* — Edward Look
*Assistant Examiner* — Juan G Flores
(74) *Attorney, Agent, or Firm* — Oblon, Spivak, McClelland, Maier & Neustadt, L.L.P.

(57) ABSTRACT

A compressor housing resistant to a titanium fire (burning titanium). A mixed housing is constructed, in which a structure holding stator blades includes a single-cast part made from titanium or titanium alloy, and at least one element forming a shield made from refractory alloy(s), and which is incombustible in presence of burning titanium, where each shield is secured to the single-cast part by fasteners. The fasteners are positioned with each shield so as to define jointly an inner wall demarcating an outer contour of the compressor airstream.

16 Claims, 2 Drawing Sheets

(56) References Cited

U.S. PATENT DOCUMENTS

Figure 1:
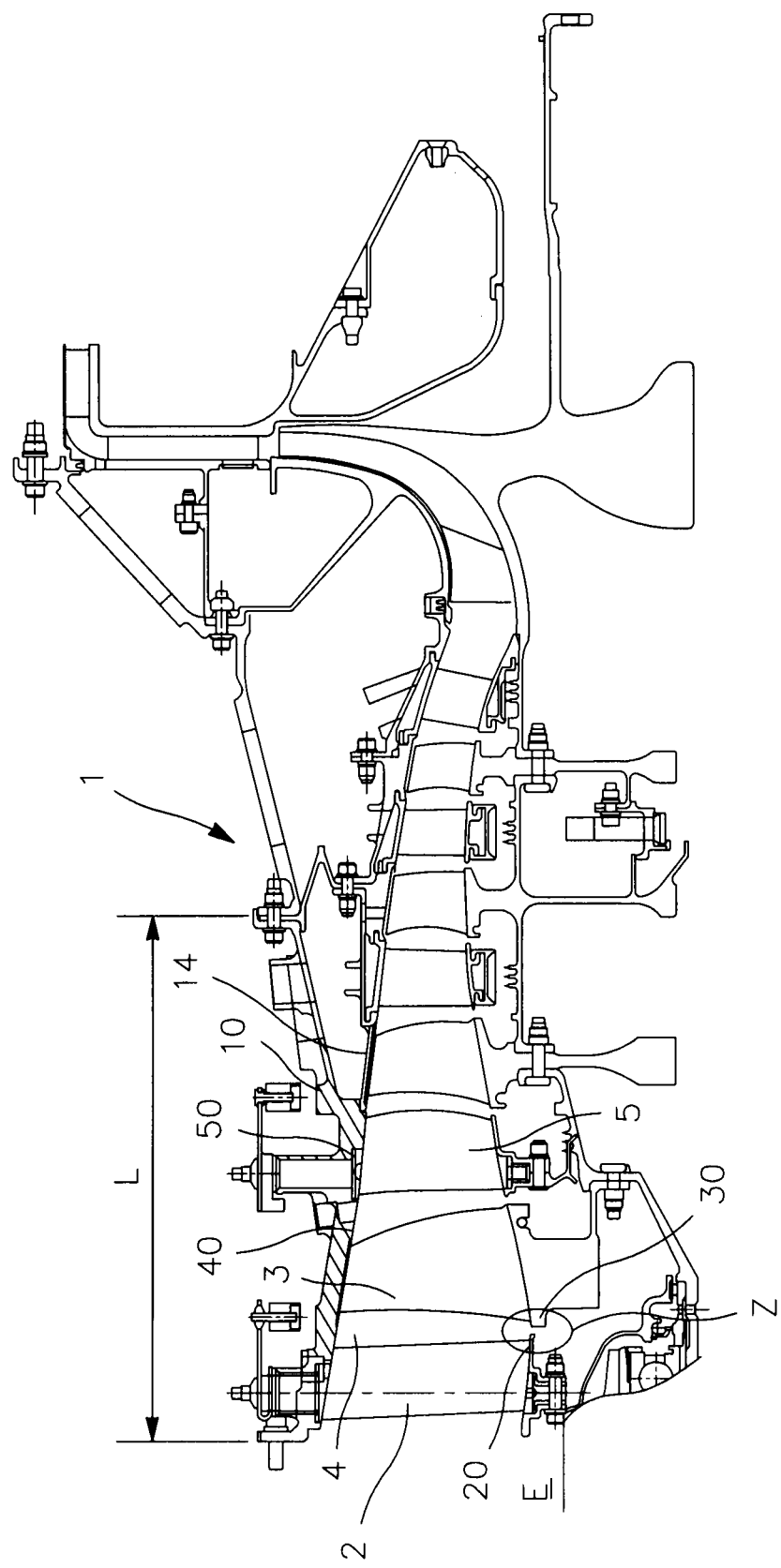

| | | | |
|---|---|---|---|
| 5,921,751 | A | 7/1999 | Freling et al. |
| 7,805,945 | B2 | 10/2010 | Grote et al. |
| 2005/0031891 | A1 | 2/2005 | Kaiser et al. |

FOREIGN PATENT DOCUMENTS

| | | |
|---|---|---|
| FR | 2 560 640 | 9/1985 |
| FR | 2 560 641 | 9/1985 |
| JP | 7-35796 U | 7/1995 |
| JP | 7-279687 A | 10/1995 |
| JP | 9-504340 A | 4/1997 |
| JP | 2007-510121 A | 4/2007 |
| WO | 2005 071228 | 8/2005 |
| WO | WO 2005071228 A1 * | 8/2005 ............. F01D 11/12 |
| WO | 2008 095463 | 8/2008 |

OTHER PUBLICATIONS

Combined Chinese Office Action and Search Report issued Dec. 25, 2012 in Patent Application No. 200980134435.2 with English Translation.

International Search Report issued Sep. 29, 2009 in PCT/EP09/061382 filed Sep. 3, 2009.

French Search Report issued Apr. 1, 2009 in French Patent Application 08 55959 filed Sep. 5, 2008.

U.S. Appl. No. 13/060,726, filed Feb. 25, 2011, Ferrer, et al.
U.S. Appl. No. 13/060,748, filed May 16, 2011, Ferrer, et al.
U.S. Appl. No. 13/060,719, filed May 19, 2011, Ferrer, et al.

* cited by examiner

COMPRESSOR HOUSING RESISTANT TO TITANIUM FIRE, HIGH-PRESSURE COMPRESSOR INCLUDING SUCH A HOUSING AND AIRCRAFT ENGINE FITTED WITH SUCH A COMPRESSOR

TECHNICAL FIELD

The invention concerns the manufacture of a compressor housing which is resistant to titanium fire.

It also concerns a high-pressure axial compressor comprising such a housing and an aircraft engine, such as an aircraft turbojet fitted with such a housing.

PRIOR ART

In a turbomachine such as an aircraft turbojet the high-pressure compressor housings must demonstrate their ability to resist a fire known as a "titanium fire".

Such a titanium fire is caused by undesired friction appearing between a moving part, for example a rotor blade, made from titanium, of the compressor and a stationary titanium part of the compressor. This undesired friction may lead to local overheating of at least one of the parts in contact: a rotor blade or stationary part, which leads to volume combustion of the titanium alloy. The temperature of the burning liquid material (titanium or titanium alloy) may reach 2700° C. either locally in the friction zone, or inside the burning titanium particles which are projected in the airstream of the compressor from the friction zone. As a result, the melting points of the surrounding material brought into contact with the liquid titanium are exceeded, which thus generates fuel in the structure. This phenomenon is maintained by substantial pressures and oxygen flow rates, which are found at the airstream inlet in modern high-pressure compressors. Thus, in the case of new-generation turbojets requiring high pressures at the inlet of the high-pressure axial compressor, there is a potential risk of friction possibly leading to the combustion of titanium, for example between the first row of stator blades and the nozzle formed by the lower part of the rotor blades. Subsequently, the burning particles can be projected in the compressor airstream and reach the outer housing. In the past, titanium fires went as far as traversing all the way through housing walls, with the resulting prejudicial consequences. These consequences are particularly prejudicial since the titanium fire can only be extinguished by itself during the operation of a functioning turbojet.

To protect the compressor housings from titanium fires various solutions have already been proposed.

Certain thermal techniques for protecting housings used are either Draconian (elimination of titanium-based alloys and replacement by steels or nickel bases or bases of other materials), or sophisticated (installation of specific liners on the titanium- or titanium alloy-based housing, thermal protection accomplished by means of plasma, treatment of surfaces which are potentially in contact when the engine is in operation). One may cite as thermal protection liner-layers the solutions described in patents FR 2 560 640 and FR 2 560 641. However, these solutions prove to be heavy, cumbersome and sometimes limited over time, i.e. not compatible with lifetimes of turbomachines such as aircraft turbojets.

The literature also mentions non-combustible titanium alloys, but which have higher density than standard alloys. None of these alloy-based solutions said to be non-combustible has genuinely been validated at the time of writing.

The aim of the invention is thus to propose a solution enabling a turbomachine compressor housing to be protected from every titanium fire which might break out, whilst maintaining most of the advantages of titanium or of its conventional alloys (high mechanical resistance and low density).

ACCOUNT OF THE INVENTION

To this end, the goal of the invention is a housing including at least one part constituting the structure holding the rows of stator blades and an inner wall demarcating the outer contour of a compressor airstream in which are assembled rows of rotating rotor blades individually sandwiched between the rows of stator or variable pitch blades, and means for thermal protection against burning titanium wherein it comprises over at least one part of its length, as a load-bearing structure, a single-cast part made from titanium or titanium alloy and, as means of thermal protection, at least one element forming a shield made from refractory alloy(s) and incombustible in the presence of burning titanium, where the shield(s) is(are) secured to the single-cast part by fasteners, where the latter are positioned with the shield(s) so as to define together the inner wall demarcating the outer contour of the compressor airstream.

The element(s) forming shield(s) in the sense of the invention is (are) constituted by one or more protective plates. The shield(s) in the sense of the invention is (are) not a surfacing (adherent layer) applied to the single-cast part, as known in the prior art. Unlike a surfacing, the shield according to the invention is independent and separate from the wall (load-bearing structure).

The element(s) forming the shield(s) can be diverse: they may notably be profiled sheeting, profile(s), ferrule(s) machine from a laminate or element(s) using drawn rolled welded techniques.

Thus, according to the invention, it is possible to use as refractory alloy(s) which are incombustible in the presence of burning titanium existing refractory steels or alloys which are incombustible in the presence of burning titanium. These refractory steels or alloys are also thermally compatible (thermal treatment compatibility and similar expansion coefficients) with titanium or titanium-based alloys, which also already exist, in manufacturing compressor housings, in particular high-pressure turbojet compressors. It is possible to use as refractory alloy(s) a nickel-based or cobalt-based alloy.

According to the invention, in order to manufacture the housing, both types of material are assembled, producing a mixed structure (inner wall demarcating the airstream made of refractory steel or alloy(s)/load-bearing structure made from titanium or titanium alloy), without impairing the operation of the compressor since the fasteners are positioned such that they do not modify the airstream contour, and incorporating in it advantageously the guide bushings of the variable pitch blades.

The solution according to the invention constitutes an effective response to the titanium fire, whilst retaining most of the intrinsic advantage of titanium, namely a low density and a high mechanical resistance, for the load-bearing structure.

The preferred material for the shield(s) made from steel or steel alloy is chosen from among 17-4 PH steel, Z 12 CNDV 12 steel, Inconel® 909 (UNS N109909), Inconel® 783 (UNS R30783), or the alloy JETHETE M 152.

A particularly advantageous titanium alloy for the load-bearing structure is chosen from among Ti 6 4, Ti 6242 or Ti 6246.

According to an embodiment, the housing includes at least one layer of anti-corrosion material sandwiched between each shield made from refractory steel or alloy(s) and incombustible in the presence of burning titanium and the single-cast part made from titanium or titanium alloy. This layer of anti-corrosion material can advantageously be produced by anodic oxidation of the titanium of the load-bearing structure. By this means the risks of corrosion of the steel by friction at the interface is prevented. This layer of anti-corrosion material can also be completed by a layer of paint, for example an aluminium pigment paint applied to the part of the shield made from refractory steel or alloy in contact with the load-bearing structure made from titanium or titanium alloy.

According to a variant, the shield can be of a length corresponding to only one part of the annular length of the housing.

On the inner diameter of the shield, or downstream from the length to which it is attached, a wear material suitable for defining the outer contour of the airstream can be attached or applied, for example using a plasma technique. This wear material constitutes the abradable opposite the rotor blades, i.e. a material capable of being planed or eroded by the friction of the rotating blade heads against the housing.

The shield(s) made from refractory steel or alloy(s) according to the invention may have a T shape, according to an axial section of the housing.

According to an advantageous embodiment, the fasteners include one or more flanged bosses attached individually in the bores made in the single-cast titanium or titanium alloy part, and in bored skirts made in the shield(s), where the fastener of each boss is made to provide surface continuity with the shield(s) in order to ensure the continuity of the outer contour of the airstream. In other words, the bosses are advantageously assembled so that their skirt is supported in bores of the same diameter, and which form skirts made in the thickness of the material of the shield(s). The thickness of the skirts des bosses can be of the order of half of the thickness of the shield(s).

Advantageously, at least part of the bosses consist of variable pitch blade pivot guide bushings. Thus, it will not be necessary, in compressors fitted with blades of this type, to use additional fasteners.

The bosses are preferably bosses crimped individually in the bores of the single-cast part. The bosses are preferably cold-crimped bosses. They will also be able advantageously to be cold-crimped using the existing FTI® method, particularly in the case of the guide bushings of the variable pitch blades. The bosses will be able to be manufactured advantageously from the same alloy as the one constituting the shield. When the bosses consist partly of the blade guide bushings they will be able to be, for example, made from Hastelloy® X (UNS N06002) or work-hardened A 286 steel.

It is conceivable to have means for blocking axial translation of the additional shield(s). Advantageously, these additional means for blocking axial translation can consist partly of an attaching flange machined directly in another housing positioned to form an uninterrupted continuation, against which a part of the shield(s) is/are in axial abutment. Thus, it is possible to use advantageously the attaching flange downstream from the intermediate housing, i.e. the flange used for attaching the housing to the housing of the high-pressure (HP) compressor of a turbojet, or the attaching flange upstream from the HP compressor downstream housing.

The invention also concerns a high-pressure axial compressor comprising, as a stator, a housing as previously defined.

According to an advantageous embodiment, the length of the housing constitutes only the part upstream from the compressor, where the inner wall demarcating the outer contour of the downstream airstream is made from titanium or titanium alloy.

Finally, the invention concerns an aircraft engine including a compressor as referred to above.

BRIEF DESCRIPTION OF THE ILLUSTRATIONS

Figure 2A:
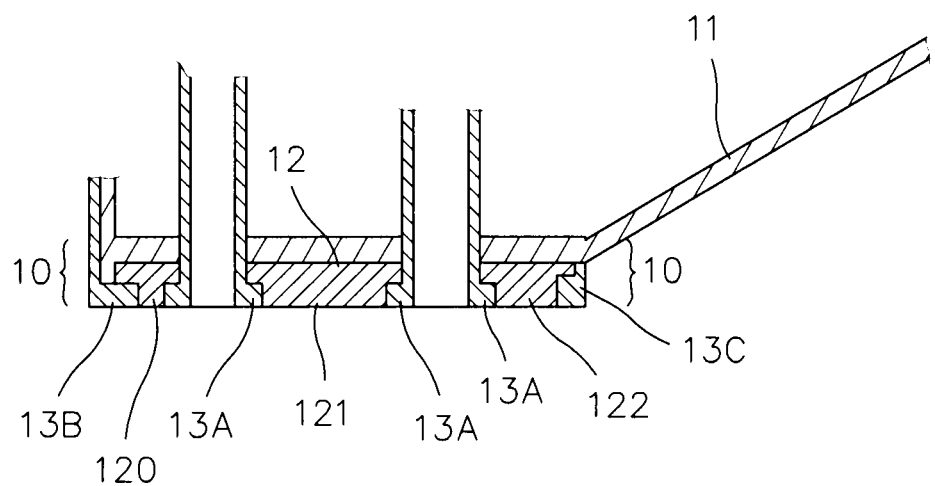
Figure 2B:
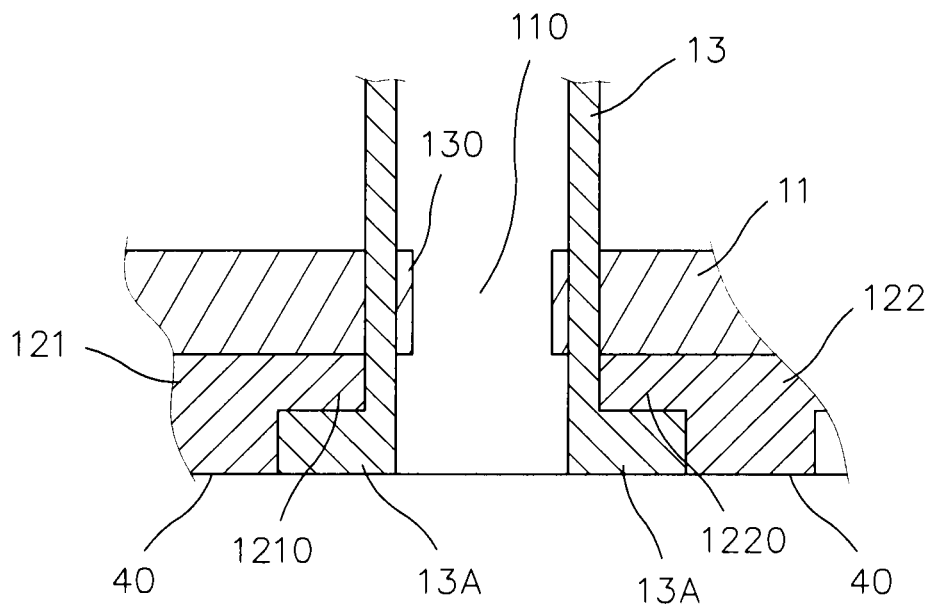

Other characteristics and advantages of the invention will be seen more clearly on reading the detailed description below, made with reference to the following figures, among which:

FIG. 1 is a lengthways section view of a high-pressure axial compressor of an aircraft turbojet according to the invention, FIG. 2A is a diagrammatic lengthways section view of the outer housing used in the compressor according to FIG. 1, FIG. 2B is a detailed view showing the fasteners used for the housing according to FIG. 2A.

DETAILED ACCOUNT OF PARTICULAR EMBODIMENTS

In FIG. 1 a high-pressure compressor 1 of a new-generation turbojet, i.e. with high pressures at inlet E, has been represented.

This type of compressor 1 includes a first row of gas diffusion stator blades 2 upstream from a first row of rotor blades 3. All the blades 2, 3 are made from titanium or titanium alloy. During the operation of the turbojet there is a risk of severe contact by friction between the base 20 of the stator blades 2 and the base 30 of the rotor blades 3 in the zone Z illustrated in FIG. 1.

This risk of severe contact by friction may lead to ignition of the titanium in this zone Z. It is then necessary to prevent burning titanium particles from propagating the combustion to the outer housing 10. Indeed, such particles can be expelled in the airstream of the gases 4 and as a result come into contact with the outer housing 10. The risk of contact is greater with the downstream part of the latter 10, which extends over a certain length L. This length L is the distance between two points, one of which marks the inversion of the inclinations in the profile of the housing, and the other of which is a mating surface with the downstream structure of the HP compressor, which becomes a superalloy structure in a gas stream.

If this outer housing 10 is made exclusively of titanium or titanium alloy, a titanium fire can then be created and thus spread to all the other parts constituting the turbojet.

To prevent this, according to the invention, an outer housing 10 is made in two parts 11, 12, a part 11 of which is a single-cast titanium or titanium alloy part, and the other part of which 12 consists of a number of profiles 120, 121, 122 made from refractory steel or alloy(s), forming shields, and which are incombustible in the presence of burning titanium (FIG. 2A). The number of profiles 120, 121, 122 made from refractory steel or alloy(s) which is (are) incombustible in the presence of burning titanium, thus constitutes in a certain sense a fire-proofing shield for the load-bearing structure, against any burning titanium particle which might enter this part L of the housing 10.

According to the invention, profiles 120, 121, 122 are secured to the single-cast part by fasteners 13. The latter 13 are positioned with the profiles 120, 121, 122 so as to define together the inner wall 10 demarcating the outer contour 40 of the compressor airstream 4.

In the illustrated embodiment, the part forming a load-bearing structure 11 is made from a forged blank or from a casting made from titanium alloy. The metal profiles 120, 121, 122 are made from plates made of an alloy with a low expansion coefficient, such as inconel 909 or 783.

In FIG. 2B fasteners 13 of two consecutive profiles 121, 122 constituting the anti-titanium fire protection shield have been represented. Thus, the attaching of the refractory steel or alloy(s) plates 121, 122 which are incombustible in the presence of a titanium fire is accomplished as follows.

Each profile 121, 122 has an axial section shape roughly in the shape of a T, and thus each defines two concentric grooves, obtained preferably by machining. The two profiles 121, 122 are crimped simultaneously through a row of bosses 13 with skirts 13A distributed uniformly over the annular circumference, which are crimped individually in a bore 110 made in the forged blank of the titanium or titanium alloy structure. Each boss 13 is crimped by a crimped collar 130, preferably using an FTI®-type cold-expansion method. Thus, one of the concentric grooves 1210 of one of the profiles 121 and one of the concentric grooves 1220 of the profile 122 positioned immediately downstream are crimped by the same row of bosses 13 (FIG. 2B). The flanged bosses used 13 are preferably made from the same alloy as the shield or from Hastelloy® X or from A286 steel for the guide bushings of the variable pitch blades. As represented, the shield 121 is attached by anchoring the branches of the T with two skirts 13A facing in different directions, one upstream and the other downstream (FIG. 2A). Advantageously, the shield 120 or 122 is also attached in axial abutment with a part of an attaching flange 13B machined directly in another housing extending in uninterrupted fashion. In the embodiment, the part 13B of the attaching flange used to attach shield 120 consists of the attaching flange of the intermediate housing, unrepresented, of the high-pressure compressor 1. Part 13C of the attaching flange used to block the rotational translation of the shield 122 may consist of the attaching flange of the housing 14 downstream from the high-pressure compressor 1.

Thus, according to the invention, the positioning of the bosses 130 with the profiles 121, 122 demarcates the outer contour 40 of the compressor airstream 4. In other words, the chosen fastening judiciously allows not only the titanium or titanium alloy load-bearing structure 11 to be attached together with the shields 120, 121, 122 for thermal protection against the titanium fire, but also allows the outer contour 40 of airstream 4 to be defined precisely.

According to an advantageous attachment variant, when the high-pressure compressor 1 includes a row of variable pitch blades 5, the flanged boss 13 according to the invention which can be used consists of the pivot bushing 50 of the said blades 5. Thus, in the outer housing 10 represented in FIG. 1, the third row of blades 5 consists of a row of variable pitch stator blades, the adapter sleeves of which also constitute flanged bosses 13 according to the invention, i.e. which are used to attach the shields 120, 121, 122.

According to a variant of the invention the interface between the refractory steel or alloy(s) plate 120, 121 or 122 and the titanium or titanium alloy load-bearing structure 11 can be treated by anodic oxidisation of the titanium to prevent the risks of corrosion by relative friction between these parts. To obtain such an anti-corrosion effect, the steel constituting the shields 120, 121 or 122 can itself advantageously be covered with a paint, for example an aluminium pigment paint facing the anodic oxidised titanium.

The outer housing 10 constituted in this manner enables a load-bearing structure 11 made of titanium alloy (Ti 6 4, 6242 or 6246, for example), protected from risks of titanium fire by plate 12, which is itself attached by crimped bosses 13, thus simplifying the assembly and the machinings of the outer skirts 120, 121, 122.

The invention as described enables:

A) the airstream of the high-pressure compressors to be protected by means of an alloy which is incombustible when exposed to a titanium fire, B) the outer part or load-bearing structure to be manufactured with a titanium alloy outside the zone potentially concerned by the titanium fire, C) a substantially lower mass to be maintained, compared to solutions involving housings made completely of refractory steel or alloy(s). For example, an outer housing 10 of average thickness 1.5 mm may be envisaged, using as profiles 12 plates made of Inconel® 909, as constructed over length L in the illustrated embodiment, with a weight some 10 kg less than a housing of identical shape and dimensions, made completely from refractory steel or alloy(s). Thus, the "average" density of the housing according to the invention is equivalent to that of a housing made from alloys derived from titanium said to be fire-proof.

The invention claimed is:

1. A housing comprising:
   at least one part including a structure holding rows of stator blades and an inner wall demarcating an outer contour of a compressor airstream in which are assembled rows of rotating rotor blades individually sandwiched between the rows of stator or variable pitch blades; and
   means for thermal protection against burning titanium that includes over at least one part of its length, as a load-bearing structure, a single-cast part made from titanium or titanium alloy and, as means of thermal protection, at least one element forming a shield made from refractory alloy(s) and incombustible in presence of burning titanium, wherein each shield is secured to the single-cast part by fasteners,
   wherein the fasteners are positioned with each shield so as to define together the inner wall demarcating the outer contour of the compressor airstream.

2. A housing according to claim 1, wherein the refractory alloy which is incombustible in the presence of burning titanium is a alloy chosen from among 17-4 PH steel, Z 12 CNDV 12 steel, UNS N109909, UNS R30783, or the alloy JETHETE M 152.

3. A housing according to claim 1, wherein the titanium alloy is chosen from among Ti 6 4, Ti 6242, or Ti 6246.

4. A housing according to claim 1, further comprising at least one layer of anti-corrosion material sandwiched between each shield made from refractory steel or alloy and incombustible in the presence of burning titanium and the single-cast part made from titanium or titanium alloy.

5. A housing according to claim 1, wherein a length of the shield corresponds only to a part of an annular length of the housing.

6. A housing according to one claim 1, wherein downstream from the length on to which is attached each shield or on the inner diameter of each shield, a wear material configured to define the outer contour of the airstream is attached or applied.

7. A housing according to claim 1, wherein each shield has, according to an axial section in the housing, a T shape.

8. A housing according to claim 7, wherein the fasteners include one or more flanged bosses attached individually in bores made in the single-cast titanium or titanium alloy part, and in bores made in each shield, wherein the fastener of each boss provides surface continuity with each shield to ensure continuity of the outer contour of the airstream.

9. A housing according to claim 8, wherein at least a part of the bosses includes guide bushings of variable pitch blade pivots.

10. A housing according to claim 8, wherein the bosses are bosses crimped individually in the bores of the single-cast part.

11. A housing according to claim 10, wherein the bosses are cold-crimped bosses.

12. A housing according to claim 8, wherein the bosses are made from UNS N06002, or A 286 steel, or from the alloy of each shield.

13. A housing according to claim 1, further comprising means for blocking axial translation of each shield by fasteners which includes a part of an attachment flange machined directly in another housing extending in uninterrupted fashion, against which part of each shield is in axial abutment.

14. A high-pressure axial compressor including, as a stator, a housing according to claim 1.

15. A high-pressure compressor according to the claim 14, wherein the length of the housing constitutes only the upstream part of the compressor, and wherein the inner wall demarcating the outer contour of the downstream airstream is made from titanium or titanium alloy.

16. An aircraft engine including a compressor according to claim 14.

\* \* \* \* \*